United States Patent
Fukawatase et al.

(10) Patent No.: US 8,056,925 B2
(45) Date of Patent: Nov. 15, 2011

(54) COLUMN-MOUNTED KNEE AIRBAG DEVICE

(75) Inventors: Osamu Fukawatase, Nishikamo-gun (JP); Kenji Imamura, Kosai (JP); Akiyoshi Sanada, Nishikamo-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 119 days.

(21) Appl. No.: 12/447,601

(22) PCT Filed: Oct. 4, 2007

(86) PCT No.: PCT/JP2007/069483
§ 371 (c)(1),
(2), (4) Date: Apr. 28, 2009

(87) PCT Pub. No.: WO2008/053664
PCT Pub. Date: May 8, 2008

(65) Prior Publication Data
US 2010/0052295 A1    Mar. 4, 2010

(30) Foreign Application Priority Data
Oct. 31, 2006   (JP) ................ 2006-296754

(51) Int. Cl.
   B60R 21/203 (2006.01)
   B62D 1/18 (2006.01)
(52) U.S. Cl. ............ 280/731; 280/728.2; 280/777
(58) Field of Classification Search ....... 280/730.1, 280/731, 728.2, 777, 779
See application file for complete search history.

(56) References Cited

U.S. PATENT DOCUMENTS

| 3,907,326 | A | | 9/1975 | Arntson et al. |
| 5,570,901 | A | * | 11/1996 | Fyrainer .............. 280/730.1 |
| 6,227,571 | B1 | * | 5/2001 | Sheng et al. ............ 280/777 |
| 6,375,220 | B1 | * | 4/2002 | Kamm .................... 280/777 |
| 6,492,744 | B1 | * | 12/2002 | Rudolph et al. ......... 307/10.1 |
| 6,631,924 | B2 | * | 10/2003 | Nomura et al. .......... 280/777 |

(Continued)

FOREIGN PATENT DOCUMENTS

CN   1118750   3/1996

(Continued)

OTHER PUBLICATIONS

European Search Report issued by the European Patent Office in European Patent Application No. 07 82 9221 on Feb. 3, 2010.

Primary Examiner — Paul N Dickson
Assistant Examiner — Karen A Beck
(74) Attorney, Agent, or Firm — Oliff & Berridge, PLC

(57) ABSTRACT

Rapidly constraining the knees of a driver, even for a steering column structure with plural obstructions projecting below the rear end side of the steering column, while also suppressing or preventing any detriment to column collapse operation during a frontal collision; the steering column is fixed to the vehicle body side with a lower bracket, an upper bracket and a housing, and a combination switch is disposed at the rear end side of an inner tube; lower portions are disposed in a state so as to protrude below a column tube and face each other, so that an airbag module is installed in an installation space between the two portions; a module case is manufactured from a fabric, and the airbag module is attached at a position in the vicinity of the combination switch through a rear attachment bracket.

23 Claims, 11 Drawing Sheets

U.S. PATENT DOCUMENTS

| | | | |
|---|---|---|---|
| 6,942,245 B2 * | 9/2005 | Takimoto et al. | 280/730.1 |
| 7,182,365 B2 | 2/2007 | Takimoto et al. | |
| 7,708,310 B2 * | 5/2010 | Adachi et al. | 280/731 |
| 7,722,076 B2 * | 5/2010 | Fukawatase et al. | 280/730.1 |
| 7,828,320 B2 * | 11/2010 | Adachi et al. | 280/730.1 |
| 2005/0173914 A1 * | 8/2005 | Sadakata et al. | 280/777 |
| 2005/0242562 A1 * | 11/2005 | Ridgway et al. | 280/777 |
| 2008/0100042 A1 * | 5/2008 | Adachi et al. | 280/730.1 |
| 2008/0217888 A1 * | 9/2008 | Fukawatase et al. | 280/730.1 |
| 2008/0217890 A1 * | 9/2008 | Fukawatase et al. | 280/731 |
| 2009/0322063 A1 * | 12/2009 | Adachi et al. | 280/730.1 |
| 2010/0052295 A1 * | 3/2010 | Fukawatase et al. | 280/730.1 |
| 2010/0164206 A1 * | 7/2010 | Mitsuo et al. | 280/731 |
| 2010/0237598 A1 * | 9/2010 | Johnson et al. | 280/777 |
| 2010/0244416 A1 * | 9/2010 | Mitsuo et al. | 280/731 |
| 2010/0253050 A1 * | 10/2010 | Mitsuo et al. | 280/730.1 |
| 2010/0295279 A1 * | 11/2010 | Fukawatase et al. | 280/730.1 |
| 2011/0049847 A1 * | 3/2011 | Adachi et al. | 280/730.1 |

FOREIGN PATENT DOCUMENTS

| | | |
|---|---|---|
| CN | 1662411 | 8/2005 |
| DE | 201 17 794 U1 | 5/2002 |
| DE | 102 50 405 A1 | 5/2003 |
| DE | 20 2006 001 826 U1 | 6/2006 |
| GB | 1 367 132 | 9/1974 |
| JP | A-9-104317 | 4/1997 |
| JP | A-10-71911 | 3/1998 |
| JP | A-2001-106013 | 4/2001 |
| JP | A-2002-37003 | 2/2002 |
| JP | A-2006-168426 | 6/2006 |
| WO | WO 90/09296 | 8/1990 |

* cited by examiner

COLUMN-MOUNTED KNEE AIRBAG DEVICE

TECHNICAL FIELD

The present invention relates to a column-mounted knee airbag device that inflates and deploys from a column cover of a steering column during a frontal collision, restraining the knees of a driver.

RELATED ART

There are various column-mounted knee airbag devices proposed in order to protect the knees of a driver. So-called column-mounted knee airbag devices, with an airbag module disposed to the inside of a column cover of a steering column, are disclosed in patent documents 1 and 2 below, for example.
Patent document 1: Japanese Patent Application Laid-Open (JP-A) No. 9-104317
Patent document 2: JP-A No. 2002-37003

DISCLOSURE OF THE INVENTION

Problem to be Solved by the Invention

However, there is no approach in any of the above conventional techniques from the standpoint of how to compactly house an airbag module and attach the airbag module with the minimum distance to the knees of a driver for cases where there are plural obstructions present below a steering column.

In particular, steering columns are generally of a collapsible structure in order to suppress the reaction force towards the driver side when load is input to a steering wheel toward the front in the axial direction through a driver seat airbag during a frontal collision, however designing the mounting structure of an airbag module in such cases so as to also consider the stroke of the column tube is even more extremely difficult.

In consideration of the above circumstances a first object of the present invention is a column-mounted knee airbag device that can rapidly constrain the knees of a driver and is also applicable to a steering column structure having plural obstructions below the rear end side of the steering column. A second object thereof is a column-mounted knee airbag device that can suppress to a great extent, or prevent, any detriment to the collapsing operation of the column tube during a frontal collision.

The invention of claim 1 is a column-mounted knee airbag device disposed to the inside of a column cover covering the rear end side of a steering column, the steering column configured with a steering shaft and a column tube covering the steering shaft, the steering column provided with: a first obstruction, fixed to a rear end side of the column tube and disposed in a state such that a portion of the first obstruction projects down below the column tube; and a second obstruction, fixed to the rear end side of the column tube at a position separated by a specific distance from the first obstruction, and disposed in a state such that a portion of the second obstruction projects downward below the column tube, wherein an airbag module is disposed at the column tube below the outer peripheral face of the column tube between the first obstruction and the second obstruction, the airbag module configured including gas generating means for generating gas when there is a collision, and a knee-airbag, which is housed at the inside of the column cover in a folded state and which receives the supplied gas and inflates and deploys toward a driver-knee side.

The invention of claim 2 is the column-mounted knee airbag device of claim 1, wherein: the first obstruction is a combination switch, and the second obstruction is a housing for supporting the column tube on instrument panel reinforcement extending along the vehicle width direction.

The invention of claim 3 is the column-mounted knee airbag device of claim 1 or claim 2, wherein the column tube is configured with a double-tube construction collapsible within a specific stroke range by input of a load of a specific value or greater, and the gas generating means is disposed within the airbag module toward the first obstruction side, and the knee-airbag in the folded state is disposed within the airbag module adjacent to the gas generating means at the second obstruction side.

The invention of claim 4 is the column-mounted knee airbag device of claim 3, wherein a module case of the airbag module is configured from a material that is flexible and/or soft.

The invention of claim 5 is the column-mounted knee airbag device of claim 3, wherein the airbag module is fixed to the column tube at a position in the vicinity of the first obstruction using an attachment member.

The invention of claim 6 is the column-mounted knee airbag device of claim 5, wherein an escape portion is provided to the second obstruction, or to the fixed-side tube that relatively moves integrated to the second obstruction at a position of the fixed-side tube facing the attachment member when the column tube is collapsing, for avoiding interference with the attachment member.

The invention of claim 7 is the column-mounted knee airbag device of claim 4, wherein a rear end side of the module case of the airbag module is fixed to the column tube at a position in the vicinity of the first obstruction using a rear end attachment member, and a front end side of the module case is fixed to the second obstruction using a front end attachment member.

The invention of claim 8 is the column-mounted knee airbag device of claim 7, wherein the rear end attachment member and the front end attachment member are disposed so as not to overlap in the vehicle width direction when viewed along the axial direction of the steering column.

The invention of claim 9 the column-mounted knee airbag device of claim 4, wherein a rear end side of the module case of the airbag module is fixed to the column tube at a position in the vicinity of the first obstruction using a rear end attachment member, and a front end side of the module case is supported so as to be able to slide relative to the column tube by use of a front end attachment member.

The invention of claim 10 is the column-mounted knee airbag device of claim 7, wherein the rear end attachment member is formed in substantially an M-shape when viewed along the column axial direction, and is provided with a central portion fixed to the column tube at the position in the vicinity of the first obstruction, and a pair of leg portions, the leg portions being disposed at the outside face at the rear end side of the module case with the gas generating means fixed to the leg portions.

The invention of claim 11 is the column-mounted knee airbag device of claim 1, wherein the steering column is provided with an electrically operated tilting and telescoping mechanism.

The invention of claim 12 is the column-mounted knee airbag device of claim 11, wherein the second obstruction is either a tilting-motor or a telescoping-motor.

According to the present invention of claim 1, the first obstruction and the second obstruction are disposed at the rear end side of the steering column in a state separated by a specific distance. The first obstruction and the second obstruction are also disposed in a state in which portions thereof project downward below the column tube.

In the present invention with the above described constraints, the airbag module is disposed at the column tube in the limited space below the outer peripheral face of the column tube between the first obstruction and the second obstruction, the airbag module configured including the gas generating means and the knee-airbag. Therefore the knee-airbag can be rapidly inflated and deployed during a frontal collision, and the knees of the driver can be rapidly constrained.

Namely, by disposing the airbag module in this position, the distance in side view between the steering column and the knees of the driver becomes substantially the minimum distance, so the volume of the knee airbag and the output of the gas generating means can be greatly reduced. Consequently, this reduction means the knee airbag in a folded state and the gas generating means can also be made exceedingly compact, and overall an extremely compact airbag module becomes obtainable. As a result it is possible to install the airbag module, even under the constraint of the obstructions, the first obstruction and the second obstruction, disposed in a state with the specific distance of separation therebetween in the steering column axial direction.

According to the present invention of claim 2, the combination switch is fixed to the rear end side of the column tube as the first obstruction, and in the assembled state the combination switch is disposed in a state with a portion of the combination switch projecting out below the column tube. The housing for supporting the column tube on the instrument panel reinforcement is fixed to the rear end side of the column tube as the second obstruction, and disposed in the assembled state the housing is in a state with a portion of the housing projecting out below the column tube. The airbag module is disposed between the two members. Consequently, in the present invention, since various compact-making techniques are employed by making the knee-airbag inflate and deploy at substantially the minimum distance to the driver's knees, reducing the volume of the airbag and the volume of the inflator, it is possible to install the airbag module even when not only the combination switch is disposed at the rear end side of the column tube, but also the housing is disposed so as to face the combination switch.

According to the present invention of claim 3, during a frontal collision, when a load of a specific value or greater is input to the column tube during a frontal collision the double-tube construction column tube collapses within a specific stroke range. Consequently the relative separation of the first obstruction and the second obstruction decreases, however in the present invention the gas generating means, which is a rigid body, is disposed toward the first obstruction side, and the knee-airbag in the folded state is disposed at the first obstruction side adjacent to the gas generating means (namely the gas generating means is disposed offset toward the first obstruction side), therefore there is no detriment to the collapsing operation of the column tube, or any detriment is suppressed to the minimum level.

According to the present invention of claim 4, in addition to the offset disposure of the gas generating means described above, the module case of the airbag module, configured to include the gas generating means and the knee-airbag in the folded state, is configured from a material that is flexible and/or soft. Therefore, suppose there was a small amount of interference of the second obstruction with the airbag module during column tube collapse, since the module case and the knee-airbag deform flexibly, there is no reduction in the movement stroke of the column tube (the energy absorbing stroke).

According to the present invention of claim 5, the airbag module is fixed to the column tube at a position in the vicinity of the first obstruction using an attachment member, and therefore, as well as the offset disposition of the gas generating means, the fixing point of the airbag module to the column tube is also set towards the first obstruction side, therefore detriment to collapsing operation of the column tube is further removed.

According to the present invention of claim 6, the escape portion is provided to the second obstruction, or to the fixed-side tube that relatively moves integrated to the second obstruction at a position of the fixed-side tube facing the attachment member when the column tube is collapsing, for avoiding interference with the attachment member, therefore interference of the second obstruction or the fixed-side tube with the attachment member can be avoided. It should be noted from the above stated "offset disposition of the gas generating means" is for avoiding interference between the gas generating means and the second obstruction. However in this invention when, rather than the gas generating means, an attachment member for fixing the airbag module is disposed at the second obstruction, or facing the fixed-side tube that relatively moves integrated to the second obstruction when the column tube is collapsing, the invention is for avoiding interference between the attachment member and the second obstruction or the fixed-side tube.

According to the present invention of claim 7, in a case where the module case is configured from a material that is flexible and/or soft, the module case is fixed at two locations at the front and rear thereof to the column tube, and so the airbag module can be supported at both ends instead of being supported in a cantilever manner. Since the front end side of the module case is fixed to the second obstruction using the front end attachment member, in cases where the second obstruction is a housing for fixing the column tube to the instrument panel reinforcement (claim 2) the rigidity against vibrations of the airbag module during travelling can be raised.

According to the present invention of claim 8, the rear end attachment member and the front end attachment member are disposed so as not to overlap in the vehicle width direction when viewed along the axial direction of the steering column, therefore interference of the rear end attachment member and the front end attachment member during column tube collapse can be avoided.

According to the present invention of claim 9, in a case where the module case is configured from a material that is flexible and/or soft, the module case is fixed at two locations at the front and rear thereof to the column tube, and so the airbag module can be supported at both ends instead of being supported in a cantilever manner. In addition, the front end side of the module case of the airbag module is supported so as to be able to slide relative to the column tube by use of the front end attachment member, therefore suppose there was interference of the second obstruction with the front end attachment member during column tube collapse, the movement stroke of the column tube can be accommodated by the front end attachment member sliding on the column tube, and flexing the module case etc.

According to the present invention of claim 10, the rear end attachment member is formed in substantially an M-shape when viewed along the column axial direction. The central portion of the rear end attachment member is fixed to the column tube at the position in the vicinity of the first obstruction. The pair of leg portions of the rear end attachment member is also disposed at the outside face at the rear end side of the module case, and the gas generating means is fixed to the pair of leg portions of the rear end attachment member.

According to the present invention of claim 11, the steering column is provided with an electrically operated tilting and telescoping mechanism. Interference of the second obstruction with the bottom of the column tube more often occurs in a steering column provided with an electrically operated tilting and telescoping mechanism, in comparison to a steering column provided with a manual tilting and telescoping mechanism.

According to the present invention of claim 12, the second obstruction is either a tilting-motor or a telescoping-motor. Namely, a steering column provided with an electrically operated tilting and telescoping mechanism has a tilting-motor and a telescoping-motor, and so the invention is effective in the presence of the second obstruction of a tilting-motor or a telescoping-motor.

EFFECT OF THE INVENTION

As explained above, according to the present invention of claim 1, an excellent effect is exhibited in that the knees of the driver can be rapidly constrained even for a steering column construction with plural obstructions below the rear end of the steering column.

The column-mounted knee airbag device according to the present invention of claim 2 exhibits the excellent effect in that a flexible response can be made even when the combination of the first obstruction and the second obstruction is a combination switch and a housing for fixing the column, and an airbag module can be mounted between the two members.

The column-mounted knee airbag device according to the present invention of claim 3, in addition to the effects obtained with the present invention of claim 1 and claim 2, exhibits the excellent effect in that any detriment to the collapsing operation of the column tube during a frontal collision due to the relationship with the gas generating means can either be suppressed to a great extent or prevented.

The column-mounted knee airbag device according to the present invention of claim 4 exhibits the excellent effect in that even supposing the second obstruction interferes with the airbag module by a small amount during collapse of the column tube, the preset movement stroke of the column tube (energy absorbing stroke) can be ensured. This effect is amplified in that even under the constraint of an even shorter distance between the first obstruction and the second obstruction the airbag module can be installed between the two members.

The column-mounted knee airbag device according to the present invention of claim 5 exhibits the excellent effect in that any detriment to the collapsing operation of the column tube during a frontal collision due to the relationship with the attachment member can either be suppressed to a great extent or prevented.

The column-mounted knee airbag device according to the present invention of claim 6 exhibits the excellent effect in that any detriment to the collapsing operation of the column tube during a frontal collision due to the relationship with the attachment member can be even more certainly suppressed or prevented.

The column-mounted knee airbag device according to the present invention of claim 7 exhibits the excellent effect in that the airbag module can be supported in a stable condition by the column tube while also suppressing vibration of the airbag module generated during travelling.

The column-mounted knee airbag device according to the present invention of claim 8 exhibits the excellent effect in that the movement stroke of the column tube can be secured in cases where the separation distance between the first obstruction and the second obstruction is short and there is still concern that the stroke might be reduced due to the attachment member of the module case even though the module case is configured from a material that is flexible and/or soft as a method employed to avoid impeding the collapsing operation of the column tube.

The column-mounted knee airbag device according to the present invention of claim 9 exhibits the excellent effect in that the airbag module can be supported by the column tube in a stable condition and also any detriment to the collapsing operation of the column tube during a frontal collision due to the relationship with the attachment member can be even more certainly suppressed or prevented.

The column-mounted knee airbag device according to the present invention of claim 10 exhibits the excellent effect in that by forming the rear end attachment member in substantially an M-shape when viewed along the column axial direction, the (gas generating means of the) airbag module can be supported by the column tube in the vicinity of the first obstruction in a well-balanced manner.

The column-mounted knee airbag device according to the present invention of claim 11 exhibits an excellent effect in that it is preferable for installation of a knee airbag device to a steering column provided with an electrically operated tilting and telescoping mechanism.

The column-mounted knee airbag device according to the present invention of claim 12 exhibits an excellent effect in that it is preferable for a steering column employing a layout in which the tilting-motor or the telescoping-motor of an electrically operated tilting and telescoping mechanism is disposed as the second obstruction.

BEST MODE OF IMPLEMENTING THE INVENTION

First Exemplary Embodiment

Explanation will now be given of a first exemplary embodiment of a column-mounted knee airbag device according to the present invention, with reference to FIG. 1 and FIG. 2 below. Note that in FIG. 1 the arrow FR indicates direction toward the vehicle front, and the arrow UP indicates direction toward the vehicle top.

Figure 1:
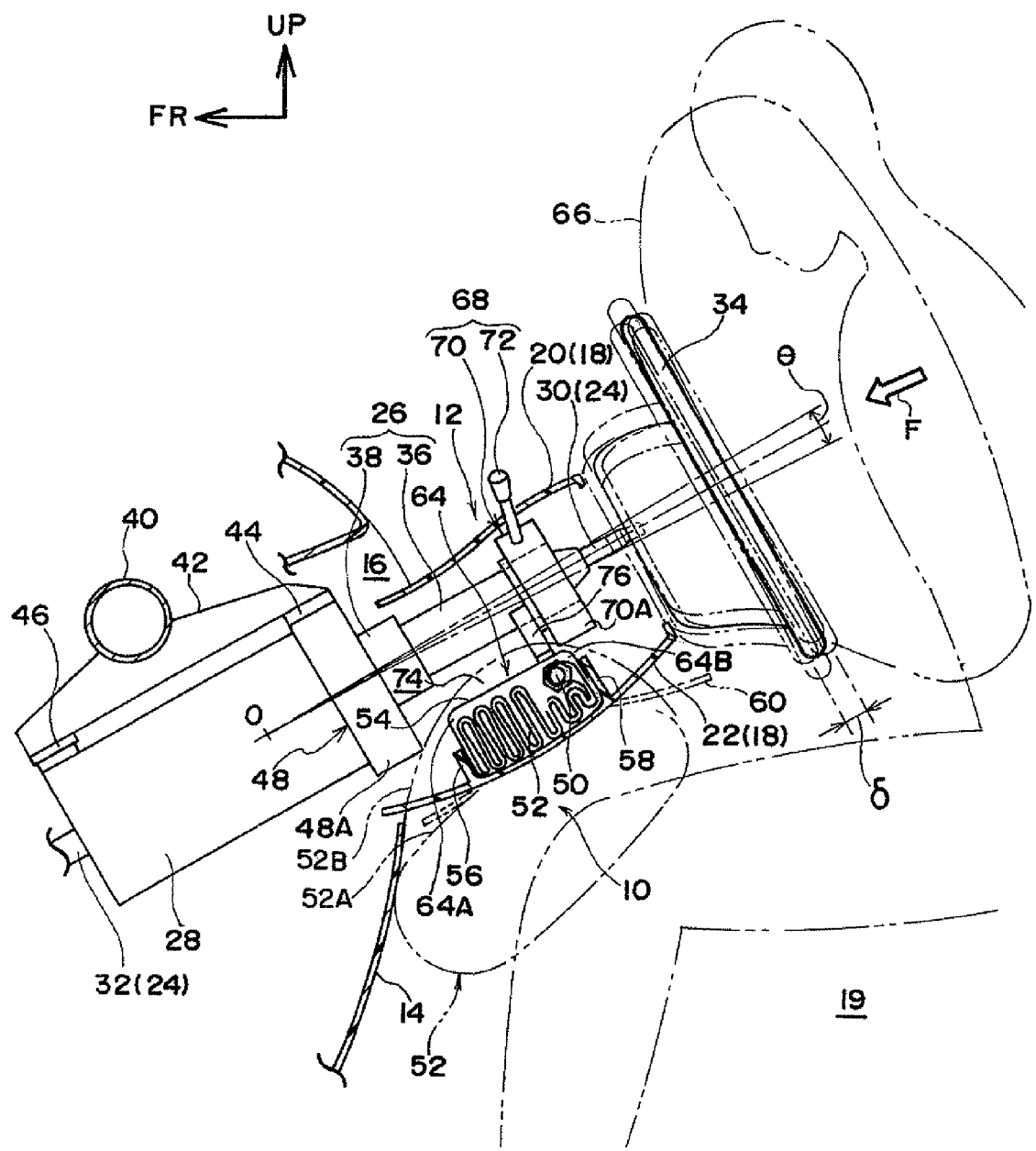
FIG. 1 is a vertical cross-section showing a side view of the overall configuration of a column-mounted knee airbag device according to a first exemplary embodiment.
Figure 2:
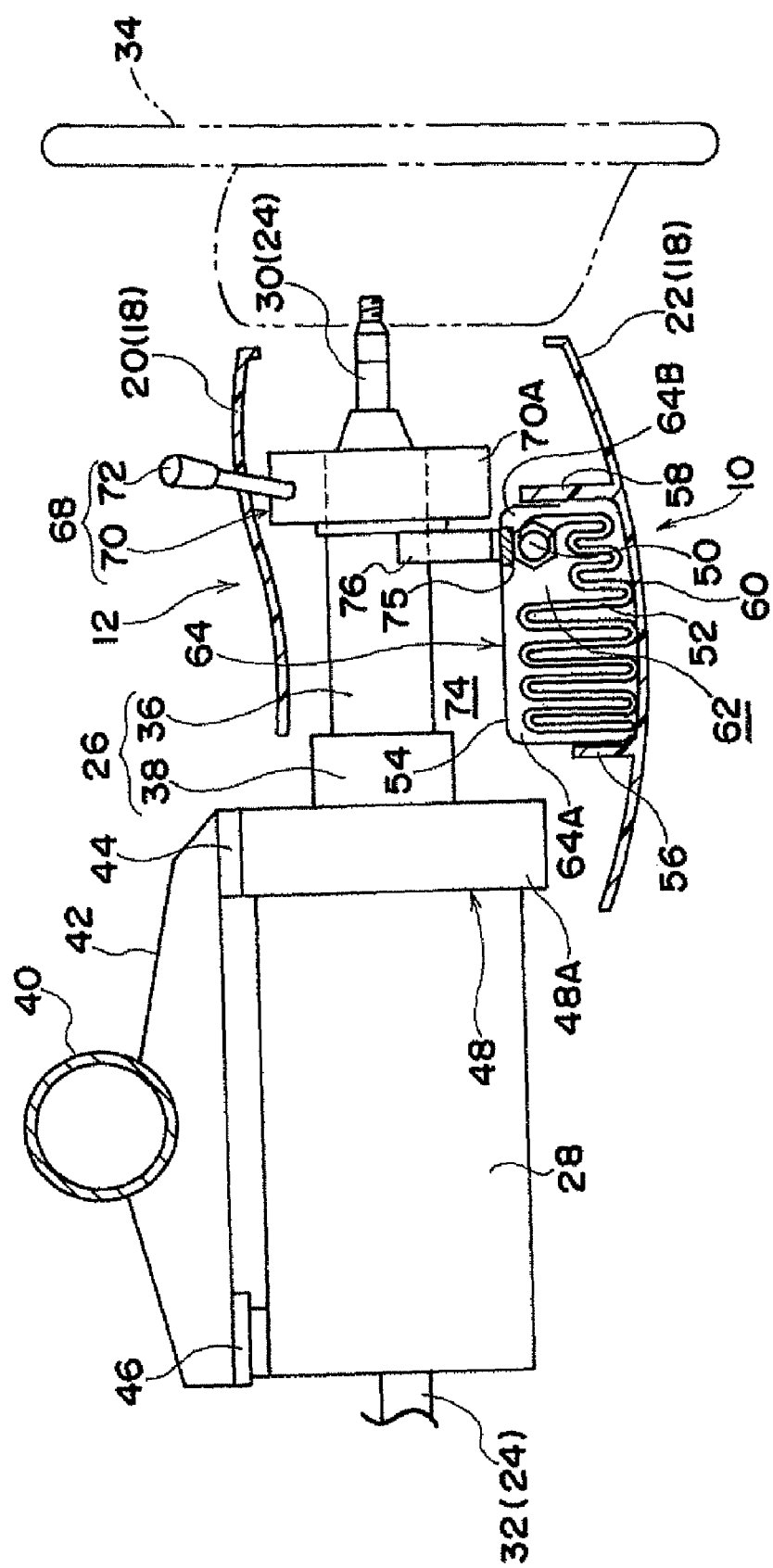
FIG. 2 is a main portion enlarged vertical cross-section showing an enlarged view of main portions of the column-mounted knee airbag device shown in FIG. 1.

FIG. 1 shows a vertical cross-section showing the overall configuration of a column-mounted knee airbag device 10 according to the present exemplary embodiment. FIG. 2 shows a vertical cross-section with an enlarged view of main portions of the column-mounted knee airbag device 10. Note that FIG. 2 is drawn with the direction of a steering column 12 drawn horizontal.

As shown in these figures, there is an opening 16 formed at the drivers seat side of an instrument panel 14, and the steering column 12 is disposed tilting forward and passing through the opening 16. A column cover 18 is disposed at a position facing the opening 16 of the instrument panel 14, covering the rear end side of the steering column 12 in a state projecting out into a cabin 19. The column cover 18 is of an upper-lower two part construction, configured from a column upper cover 20 and a column lower cover 22.

Overall Structure of the Steering Column 12

First an outline explanation will be given of the overall structure of the steering column 12 (energy absorbing mechanism, tilting and telescoping mechanism).

The steering column 12 is configured to include: a steering main shaft 24 disposed at the core axis of the steering column 12; a column tube 26, covering the steering main shaft 24 and also supported by the vehicle body; and a tilting and telescoping mechanism 28 disposed in front of the column tube 26.

The steering main shaft 24 is divided into an upper steering main shaft 30 disposed at the drivers side, and a lower steering main shaft 32 disposed at the opposite side to that of the driver. A steering wheel 34 is fixed to the rear end of the upper steering main shaft 30 with a non-illustrated lock nut. The lower end of the lower steering main shaft 32 is coupled to the upper end of a non-illustrated intermediate shaft via a universal joint. The lower end of the intermediate shaft is also coupled to a non-illustrated steering gear box.

The front end of the above upper steering main shaft 30 is coupled to the rear end of the lower steering main shaft 32 by a spline fitting of specific overlap. The steering main shaft 24 is thereby able to adjust the front-rear position of the steering wheel 34 by means of telescopic operation, or the steering main shaft 24 is collapsible within a specific stroke range (is movable in the axial direction) by application of a specific value of load or greater from the steering wheel 34 side toward the front in the axial direction. It should be noted that since the upper steering main shaft 30 and the lower steering main shaft 32 are coupled together with a spline fitting, neither component is able to rotate relative to the other. Steering force applied to the steering wheel 34 is therefore transmitted to the intermediate shaft through the steering main shaft 24, and further transmitted to the steering gear box. It should be noted that both the intermediate shaft and the steering main shaft 24 use similar collapsing structures, and are collapsible within a specific stroke range (movable in the axial direction) due to input of a load of a specific value or above (thrust load) from the steering gear box.

The column tube 26 covering the steering main shaft 24 is also configured so as to be collapsible, in a similar manner to the steering main shaft 24. Namely, the column tube 26 is of a double-tube construction of an inner tube 36 disposed at the side of the driver, and an outer tube 38 disposed at the side opposite to that of the driver. Note that the steering main shaft 24 is supported by the column tube 26 through a non-illustrated bearing in a manner allowing relative rotation therebetween. More precisely, in the present exemplary embodiment, the diameter of the outer tube 38 is set so as to be larger than the diameter of the inner tube 36, as is generally the case, however setting the relationship between the diameters as the opposite to that of the present exemplary embodiment is also possible.

The column tube 26 described above is supported by an instrument panel reinforcement 40 disposed inside of the instrument panel 14. The instrument panel reinforcement 40 extends along the vehicle width direction, and a steering-support 42 is fixed, by welding or the like, to the instrument panel reinforcement 40 at a position in plan view where the steering column 12 is disposed. An upper bracket 44, fixed to a portion at the top end of a later described housing 48, is fastened by bolts to the rear-bottom end portion of the steering-support 42. A lower bracket 46 is fastened by bolts to the front-bottom end portion of the steering-support 42, with the tilting and telescoping mechanism 28 that is integrated with the outer tube 38 attached to the lower bracket 46. Note that in the present exemplary embodiment the lower bracket 46 is provided to the tilting and telescoping mechanism 28, however there is no limitation thereto, and the lower bracket 46 may be provided in the vicinity of the front-top portion of the outer tube 38. In other words, the steering device of the present exemplary embodiment is just an example in which the lower bracket 46 is provided to the tilting and telescoping mechanism 28 because an electrically operated tilting and telescoping mechanism is employed.

As an outline explanation of one example configuration for the tilting and telescoping mechanism 28, the tilting and telescoping mechanism is provided with a tilting-motor, and when the tilting-motor is rotationally driven a feed screw (tilt worm) is rotated about the rotational axis through a drive transmission mechanism, such as a worm wheel and worm. There is a tilt-up slider provided to the feed screw, with the tilt-up slider threaded to be movable in the axial direction, and the steering column 12 moves up or down about axial center O within a specific angle range 0 (see FIG. 1) according to the axial direction movement amount of the tilt-up slider. The tilting and telescoping mechanism is provided with a telescoping-motor, and when the telescoping-motor is rotationally driven a feed screw (telescopic screw) is rotated about the rotational axis through a drive transmission mechanism, such as a worm wheel and worm. A pin-provided telescopic slider is provided to the feed screw, with the telescopic slider threaded to be movable in the axial direction. An engaging lug projecting out from the inner tube 36 of the steering column 12 is engaged with the pin of the telescopic slider. Thereby the inner tube 36 moves forward-rearward within a specific range δ (see FIG. 1) according to the movement amount of the telescopic slider. Note that tilt operation and telescopic operation are by way of a non-illustrated operation switch disposed on the column cover 18, such as on a side face thereof.

More precisely, the housing 48, supporting the column tube 26, is formed of a substantially rectangular frame shape (explanation will be given regarding this feature in a later described second exemplary embodiment shown in FIG. 4, therefore please refer to FIG. 4), and the column tube 26 is inserted through the inside of the housing 48. The outer tube 38 is supported by the tilting and telescoping mechanism 28 due to a portion of the tilting mechanism or a portion of the telescopic mechanism, provided to the tilting and telescoping mechanism 28, being integrated to the outer tube 38. The resulting structure is one in which the column tube 26 is in a supported state within the substantially rectangular frame shaped housing 48, but without touching the housing 48, allowing the steering column 12 to move up and down by tilt operation.

Structure of the Column-Mounted Knee Airbag Device 10

Explanation will now be given of the configuration of the column-mounted knee airbag device 10.

The column-mounted knee airbag device 10 is provided with functional components of: an inflator 50, as gas generating means, formed in a substantially circular cylindrical shape; and a knee airbag 52, normally stored folded up within a module case 54, described next, the knee airbag 52 inflating and deploying due to gas when gas is generated by actuation of the inflator 50.

The inflator 50 and the knee airbag 52 are stored within the module case 54 configured from a fabric, a material that is both flexible and soft. The module case 54 is anchored to a front rib 56 and a back rib 58 that project out from the inside face of the column lower cover 22 (the face on the top side when in an assembled state, the side facing the inner tube 36). A storage space 62 is thereby formed between the module case 54 and an airbag door 60 formed between the front rib 56 and the back rib 58 (see FIG. 2), and the inflator 50 and the knee airbag 52 are stored within this storage space 62. Note that the front rib 56 is set lower than the back rib 58, for avoiding interference with a lower portion 48A of the housing 48 during column collapsing.

The knee airbag 52 shown in FIG. 1 is folded up with serpentine folding, however there is no limitation thereto, and the knee airbag 52 may be folded with roll folding or a combination of the two ways of folding. However, there is merit in folding the portion of the knee airbag 52 facing the lower portion 48A of the housing 48, or all of the knee airbag 52, with serpentine folding, since ready displacement in the shrinking direction is achieved if the knee airbag 52 interferes with the lower portion 48A of the housing 48. More precisely, with regard to the deployed shape of the knee airbag 52, there is a central portion 52A for inflating to a position beneath the disposed position of the steering column 12, where the column lower cover 22 is present, and this is set relatively thin compared to two side portions 52B that inflate below the disposed position of the steering column 12, the portions between the instrument panel 14 and the two knees of the driver, which are set relatively thick.

The above described airbag module 64, configured from the inflator 50, knee airbag 52, and module case 54, is disposed below the rear end of the inner tube 36 of the steering column 12.

To explain in more detail, the inner tube 36 of the steering column 12 is a tube on the sliding side, when load is input forward in the axial direction through a driver's seat side airbag 66 that has inflated and been deployed to the steering wheel 34 side during a frontal collision, and a so-called combination switch 68 is fixed in the vicinity of the rear end of the inner tube 36. The combination switch 68 is provided with a ring-shaped body portion 70 disposed at an external peripheral portion in the vicinity of the rear end of the inner tube 36, and a left-right pair of operation levers 72 disposed in a state so as to project out from portions at both sides of the body portion 70 and pass through the column cover 18. In the state in which the body portion 70 of the combination switch 68 is assembled to the external peripheral portion of the inner tube 36, a portion of the body portion 70, namely a lower portion 70A positioned at the bottom side of the inner tube 36 in the radial direction, is disposed so as to project out by a specific amount below the outer peripheral face of the inner tube 36.

In the steering column 12 of the present exemplary embodiment the lower portion 48A of the housing 48, which supports the column tube 26 of the steering column 12 in the manner described above, is disposed projecting out by a specific amount further downward than the external peripheral face of the outer tube 38 so as to face the lower portion 70A of the combination switch 68 along the axial direction of the steering column 12. Consequently, the lower portion 70A of the body portion 70 of the combination switch 68 and the lower portion 48A of the housing 48 are disposed at the rear end of the column tube 26 of the steering column 12 in a state separated by a specific distance along the axial direction of the steering column 12, with an installation space 74 therebetween. The airbag module 64 is disposed in this installation space 74, which is narrow in the column axial direction. Note that at the stage when the airbag module 64 installation position is determined, the airbag door 60 is formed to the column lower cover 22 so as to be in a corresponding position.

The above lower portion 70A of the body portion 70 of the combination switch 68 corresponds to the first obstruction, and the lower portion 48A of the housing 48 corresponds to the second obstruction.

When installing, the inflator 50 is disposed at a position adjacent to the lower portion 70A of the body portion 70 of the combination switch 68, and the knee airbag 52 is disposed in a folded state in front of the inflator 50 (at the side of the lower portion 48A of the housing 48). In other words, in the present exemplary embodiment the inflator 50 is disposed offset to the rear end side of the inner tube 36 in the axial direction (the side of the first obstruction, which is the lower portion 70A of the body portion 70 of the combination switch 68 side). The inflator 50 is fixed to a portion at the bottom of the external peripheral face of the inner tube 36, via the rear attachment bracket 76 formed of narrow width in side view, with a narrow width plate shaped retainer 75 (see FIG. 2) as the attachment seat (note that explanation of the fixing structure is given in the later described second and third exemplary embodiments).

Operation and Effects of the Present Exemplary Embodiment

Explanation will now be given of the operation and effects of the present exemplary embodiment.

If a frontal collision occurs (or when a frontal collision is anticipated), such a state is detected by a non-illustrated frontal collision sensing means, and output to the airbag ECU. When the airbag ECU decides to actuate the airbag, the airbag devices on the driver's seat side are actuated, and the driver's seat side airbag 66 is inflated over the steering wheel 34 and the column-mounted knee airbag device 10 is also actuated. In other words a specific electrical current is caused to pass through the inflator 50 of the column-mounted knee airbag device 10, and the inflator 50 is actuated. Gas is thereby generated from the inflator 50, fed into the knee airbag 52 that is stored in a folded state, and the knee airbag 52 is inflated. When the inflation pressure of the knee airbag 52 acting on the column lower cover 22 reaches a specific value, the column lower cover 22 tears along a non-illustrated tear-line (tear portion), and the airbag door 60 opens out. The knee airbag 52 consequently inflates and is deployed beneath and to the sides of the steering column 12, and both knees of the driver are arrested by the two side portions 52B interposed between the instrument panel 14 and the two knees of the driver.

The impact during a frontal collision is also absorbed by the energy absorbing mechanism of the steering column 12. In other words, when a frontal collision occurs, the thrust load from the steering gear box is input to the intermediate shaft, and energy is absorbed by the intermediate shaft collapsing. On the steering wheel 34 side, when the upper body of the driver is arrested by the driver's seat side airbag 66, a load is input toward the front in the axial direction of the steering column 12, through the knee airbag 52 and the steering wheel 34 (arrow F of FIG. 1). When this input load is of a specific value or above, the steering main shaft 24 and the column tube 26 collapse (the upper steering main shaft 30 relatively moves in the axial direction toward the lower steering main shaft 32 side, and also the inner tube 36 relatively moves in the axial direction toward the outer tube 38 side). Collision energy input from the steering wheel 34 side is absorbed by frictional resistance occurring during this process.

With respect to this, in the present exemplary embodiment, there are obstructions present, projecting out below the column at two locations at the rear end side of the steering column 12 (the lower portion 70A of the body portion 70 of the combination switch 68 and the lower portion 48A of the housing 48). The airbag module 64 of the column-mounted knee airbag device 10 is disposed in this restricted installation space 74 between the two obstructions. Hence, the knee airbag 52 can be rapidly inflated and deployed during a frontal collision, and the knees of the driver can be rapidly constrained.

Namely, by disposing the airbag module 64 in this position, the distance in side view between the steering column 12 and the knees of the driver becomes substantially the minimum distance, so the volume of the knee airbag 52 can be greatly reduced. Note that by "knees of the driver" refers to the "kneecaps" (this also applies below). Consequently, the knee airbag 52 in a folded state can also be made exceedingly compact by this reduction, and the inflator 50 reduced in size. As a result, an extremely compact airbag module 64 is obtained, and it is possible to install the airbag module 64, even under the constraint of the two obstructions, the lower portion 70A of the body portion 70 of the combination switch 68 and the lower portion 48A of the housing 48, disposed in a state with the specific distance of separation therebetween in the steering column 12 axial direction.

Consequently, according to the above, in the present exemplary embodiment the knees of the driver can be rapidly constrained even for a steering column structure with plural obstructions below the rear end side of the steering column 12. In particular, even if the plural obstructions are a combination of the lower portion 70A of the body portion 70 of the combination switch 68 together with the lower portion 48A of the housing 48 for fixing the steering column 12 to the steering-support 42, such a combination can be flexibly addressed.

In the present exemplary embodiment, the rigid body inflator 50 is disposed (offset) towards the side of the body portion 70 of the combination switch 68, and so even though load input in the direction of arrow F to the steering column 12 during a frontal collision moves the inner tube 36 within the outer tube 38 within a specific stroke range, the inflator 50 does not interfere with the outer tube 38. Consequently, the collapsing operation of the column tube 26 is smoothly performed, and good energy absorbing ability of the steering column 12 can be maintained.

In addition, in the present exemplary embodiment, in addition to the offset position of the inflator 50, the module case 54 is manufactured from a fabric, and so even supposing a front corner portion 64A of the airbag module 64 (see FIG. 2) did interfere by a small amount with the lower portion 48A of the housing 48 during collapsing the column tube 26, the module case 54 and the knee airbag 52 are both flexibly formed. Consequently, there is no reduction in the movement stroke (energy absorbing stroke) of the column tube 26. In other words, a preset movement stroke (energy absorbing stroke) of the column tube 26 can be ensured. As a result the effect is amplified and the airbag module 64 can be installed compactly between the two portions, even under the constraint of a narrow space of the installation space 74 in the column axial direction having an even shorter distance between the lower portion 70A of the body portion 70 of the combination switch 68 and the lower portion 48A of the housing 48.

In addition, at the inner tube 36 the airbag module 64 is fixed to a location adjacent to the lower portion 70A of the body portion 70 of the combination switch 68 using the rear attachment bracket 76, of narrow width in side view, and in addition to the offset placement of the inflator 50, the fixing position of the airbag module 64 is also set at an adjacent location to the lower portion 70A of the body portion 70 of the combination switch 68, so this further removes the fear of hindrance to the collapsing operation of the column tube 26.

Second Exemplary Embodiment

Explanation will now be given of a second exemplary embodiment of a column-mounted knee airbag device according to the present invention, with reference to FIG. 3 to FIG. 5. It should be noted that portions of the configuration similar to those of the first exemplary embodiment are allocated the same reference numerals, and explanation thereof is omitted.

Figure 3:
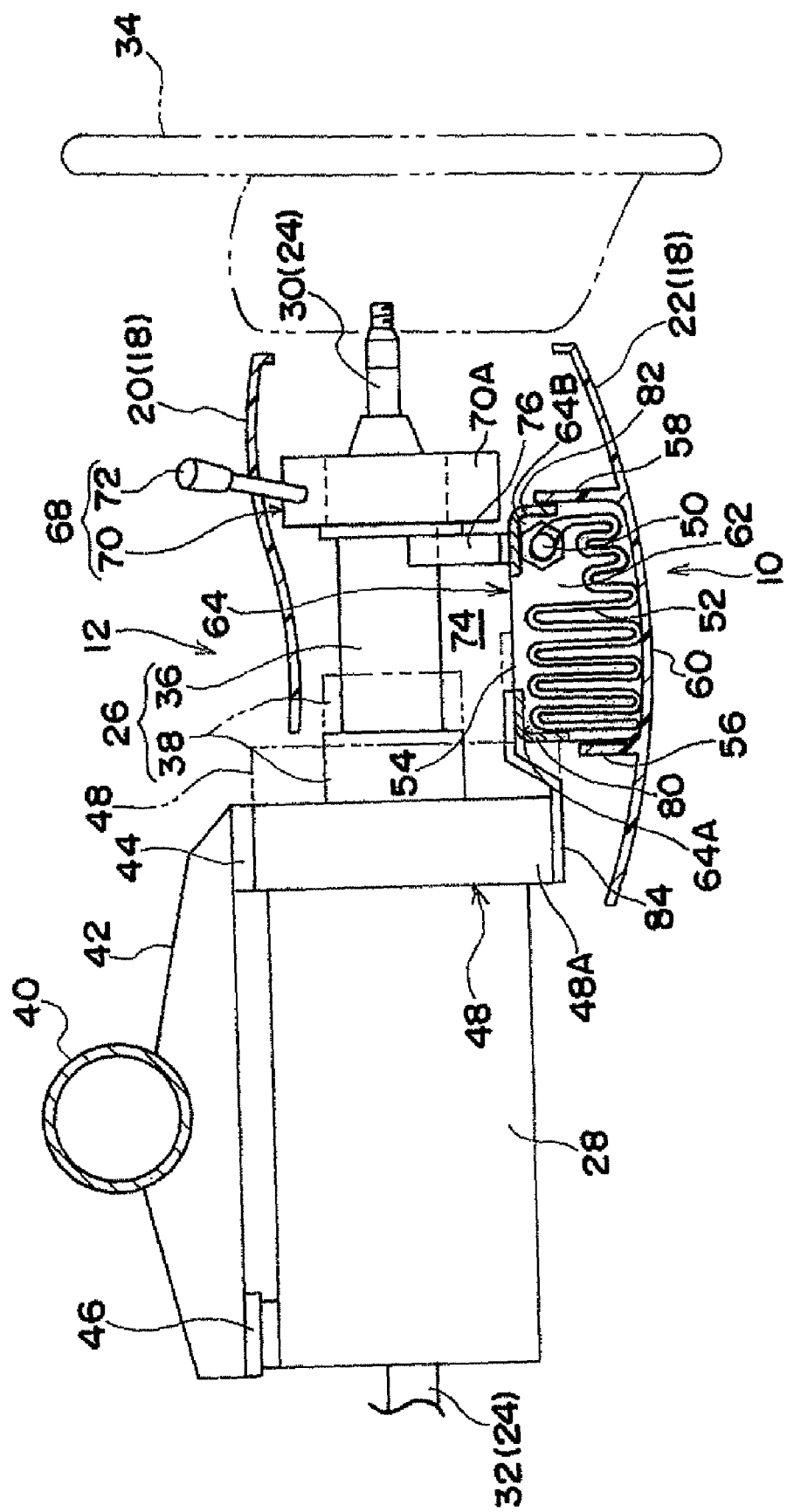
FIG. 3 is a main portion enlarged vertical cross-section showing an enlarged view of main portions of a column-mounted knee airbag device according to a second exemplary embodiment.
Figure 4:
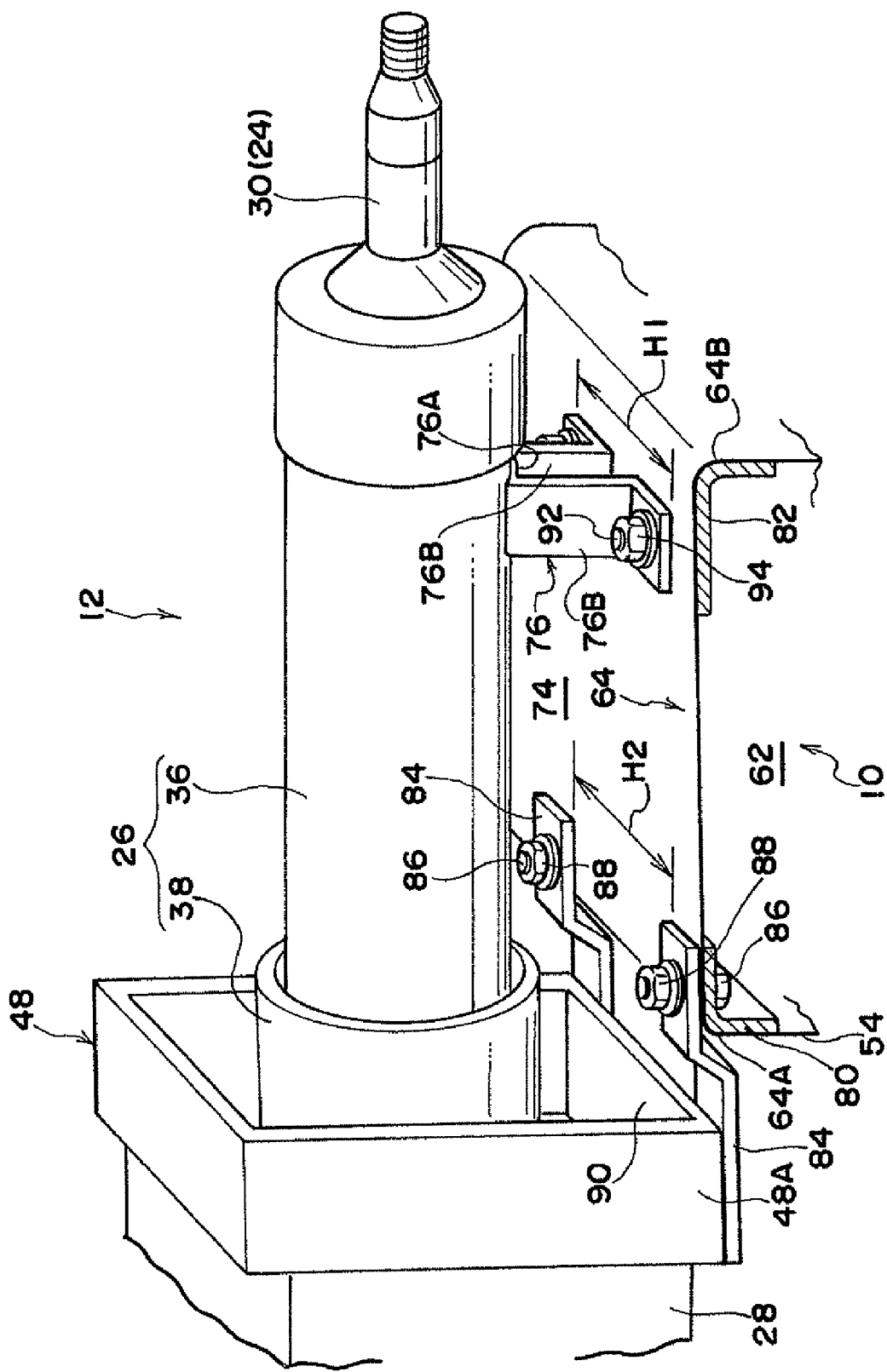
FIG. 4 is an enlarged perspective view showing an enlarged view of the positional relationships between the housing, column tube, and attachment brackets shown in FIG. 3.
Figure 5:
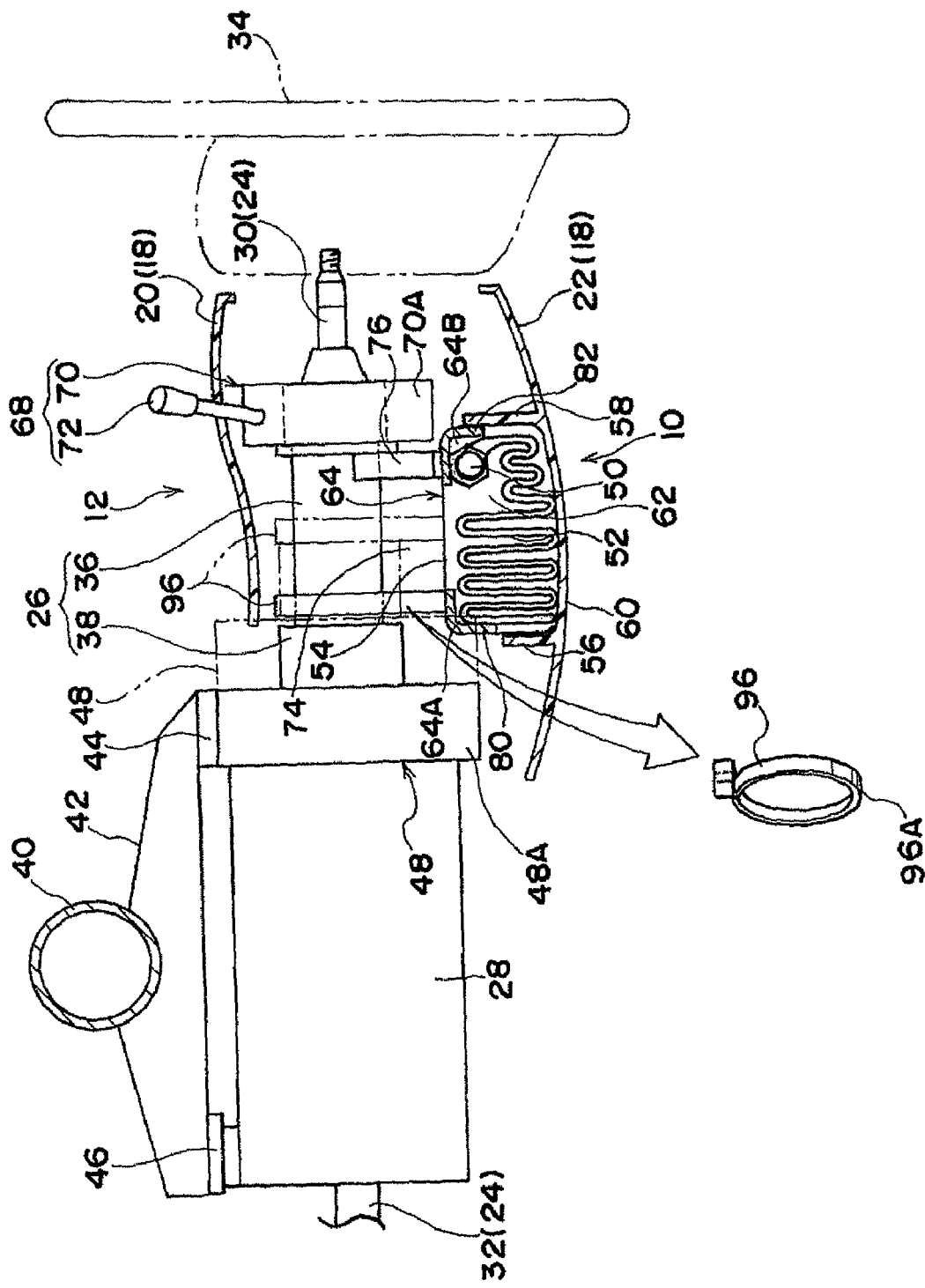
FIG. 5 is a main portion enlarged vertical cross-section corresponding to FIG. 3, showing a modified example in which a push-attachment member is used as the front attachment member, in a modified example of the second exemplary embodiment.

The second exemplary embodiment features the front corner portion 64A of the airbag module 64 slidingly fixed to the lower portion 48A of the housing 48, as shown in FIG. 3 and FIG. 4.

Specifically, there is a side view L-shaped attachment member 80 provided at a portion at the inside of the front corner of the fabric module case 54, and there is also a similarly shaped attachment member 82 provided inside a portion at the rear corner of the module case 54. At the front end side, the attachment member 80 is fixed by bolts 86 and nuts 88 to portions at the rear end of front attachment brackets 84 formed of a substantially Z-shape in side view. The front end portions of the front attachment brackets 84 are fixed, by non-illustrated fixing means such as a bolt and nut, to a bottom wall 90 configuring a portion of the lower portion 48A of the housing 48 (see FIG. 4).

The attachment member 82 at the rear end side is fixed by bolts 92 and nuts 94 to the described above rear attachment bracket 76. In the first exemplary embodiment described above only the side face of the rear attachment bracket 76 is shown in FIG. 1 and FIG. 2, however the overall formed shape of the rear attachment bracket 76 is shown in FIG. 4, and so explanation will be given thereof for the rear attachment bracket 76 of the present exemplary embodiment. The rear attachment bracket 76 is formed into substantially an M-shape when viewed along the column axial direction, with a central portion 76A fixed to a portion at the bottom of the external peripheral face of the inner tube 36, by welding or the like. A left-right pair of leg portions 76B is fixed to the attachment member 82, by the bolts 92 projecting out from the inflator 50 and the nuts 94. In the present exemplary embodiment the width dimension H1 of the rear attachment bracket 76 is set shorter than the separation distance H2 of the front attachment brackets 84 at the housing 48 side.

Operation and Effect

According to the above configuration, supposing that during column collapse (note there are occasions when the inner tube 36 moves in the axial direction into the outer tube 38 and absorbs energy, and in FIG. 3 this movement is shown in the figure as a relative positional relationship with the housing 48 for fixing outer tube 38 shown with double dashed broken lines as moving toward the column rear side) interference occurs of the lower portion 48A of the housing 48 at the front corner portion 64A of the airbag module 64, then when the lower portion 48A of the housing 48 has relatively moved up to the position of the double dashed broken lines, the lower portion 38A thereof and the attachment member 80 disposed at the front corner portion 64A of the airbag module 64 are coupled together by the front attachment brackets 84, and therefore the attachment member 80 also moves to the column rear side by the same stroke as the movement stroke of the lower portion 48A of the housing 48. The fabric module case 54 and the knee airbag 52 is also configured from a soft material, therefore the relative movement of the lower portion 48A of the housing 48 can be absorbed. Consequently, collapsing operation of the column tube 26 is performed smoothly.

In addition, the airbag module 64 is fixed at two locations, front and rear, at the column tube 26 side, using the front attachment brackets 84 and the rear attachment bracket 76, and therefore the airbag module 64 can be supported at the column tube 26 at both ends instead of being supported in a cantilever manner. Consequently, the airbag module 64 can be supported in a stabilized state at the column tube 26.

Still further, in the present exemplary embodiment, the front end side of the module case 54 is fixed, by use of the front attachment bracket 84, to the lower portion 48A of the housing 48 that is supported by the high rigidity instrument panel reinforcement 40. Therefore the rigidity to vibrations (vibration rigidity) occurring during travelling of the airbag module 64 can be raised. Consequently, vibrations occurring during travelling caused by the airbag module 64 can be suppressed.

In addition, as shown in FIG. 4, the width dimension H1 of the rear attachment bracket 76 is set shorter than the separation distance H2 of the left-right pair of front attachment brackets 84, and the two brackets are disposed so as not to be superimposed when viewed along the column axial direction. Therefore, interference of the rear attachment bracket 76 with the front attachment brackets 84 can be avoided in cases where the column tube 26 is collapsed. Consequently, when the distance between the lower portion 70A of the body portion 70 of the combination switch 68 and the lower portion 48A of the housing 48 is smaller than that of the first exemplary embodiment, by adopting the means for avoiding impeding the collapsing operation of the column tube 26 by configuring the module case 54 from fabric, the movement stroke of the column tube 26 can be secured even for cases where there might still be some concern of stroke reduction due to the front attachment brackets 84 and the rear attachment bracket 76 of the module case 54.

It should be noted that while in the present exemplary embodiment the front attachment brackets 84 are fixed to the lower portion 48A of the housing 48 (bottom wall portion bottom wall 90) there is no limitation thereto. For example, as shown in FIG. 5, a press-fit member 96 made from spring steel in a ring shape may be mounted (press-fitted) to an outer peripheral portion of the inner tube 36 at a position in the vicinity of the rear end of the outer tube 38, and the front side attachment member 80 fixed to a bottom portion 96A thereof.

Similar effects to those described in the above present exemplary embodiment are also obtainable in such cases. In addition, the press-fit member 96 is pressed by the rear end of the outer tube 38 during collapse of the column tube 26, and slides over the inner tube 36. Hence, even supposing the rear end of the outer tube 38, supported by the lower portion 48A of the housing 48, were to interfere with the press-fit member 96, the movement stroke of the column tube 26 can be absorbed by the press-fit member 96 sliding over the inner tube 36 and by flexing the module case 54 etc. This consequently means that detriment to the collapsing operation of the column tube 26 due to the relationship to the front attachment member (press-fit member 96) can be more certainly suppressed or prevented in a frontal collision.

Third Exemplary Embodiment

Explanation will now be given of a third exemplary embodiment of a column-mounted knee airbag device according to the present invention, with reference to FIG. 6 to FIG. 11B. It should be noted that portions of the configuration similar to those of the first exemplary embodiment are allocated the same reference numerals, and explanation thereof is omitted.

Figure 6:
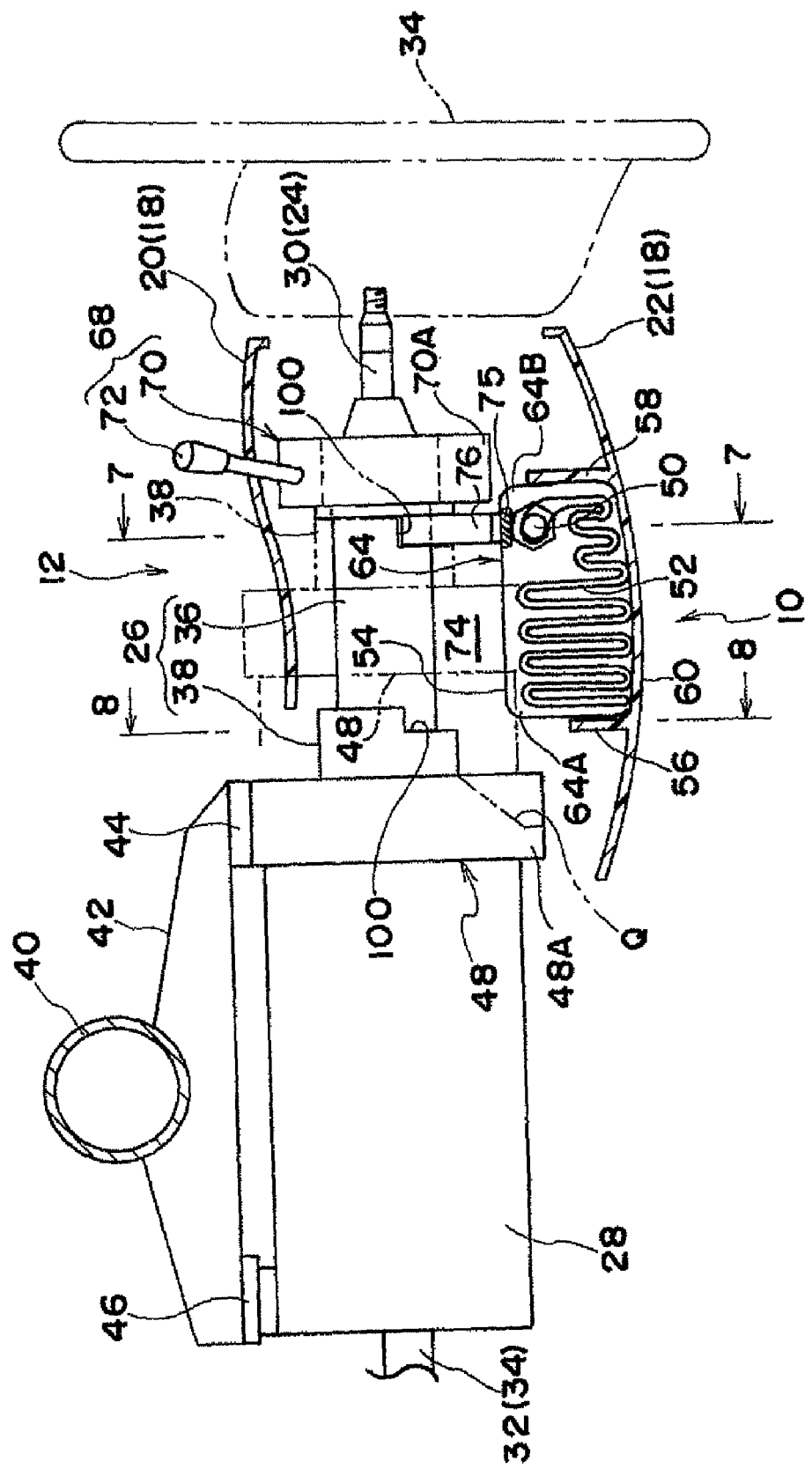
FIG. 6 is a main portion enlarged vertical cross-section showing an enlarged view of main portions of a column-mounted knee airbag device according to a third exemplary embodiment.

The third exemplary embodiment, as shown in FIG. 6, features an escape portion 100 configured as a cut-out to a rear lower portion of the outer tube 38, so as to enable sufficient collapsing stroke of the column tube 26 to be secured even when the installation space 74 of the column-mounted knee airbag device 10 is even more narrow in the steering column 12 axial direction.

Figure 7:
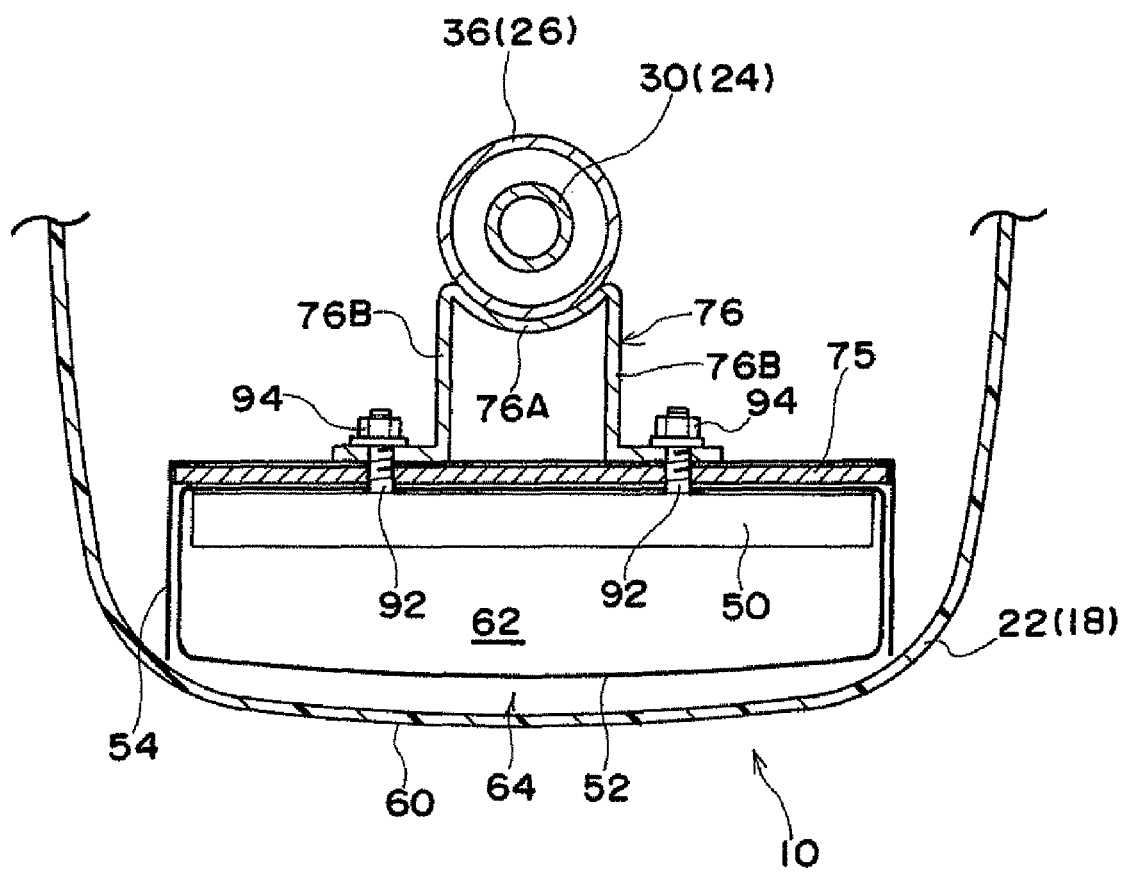
FIG. 7 is an enlarged cross-section showing an enlarged view of a cross-section on line 7-7 of FIG. 6.

To explain more specifically, as shown in FIG. 7, the airbag module 64 is fixed, as will be described later, to a bottom portion of the outer peripheral face of the rear end of the inner tube 36 on the sliding tube side, through the rear attachment bracket 76 that is formed in substantially an M-shape when viewed along the axial direction of the column tube 26. Note that the front attachment brackets 84 and the press-fit member 96 used in the second exemplary embodiment are not employed here.

Figure 8:
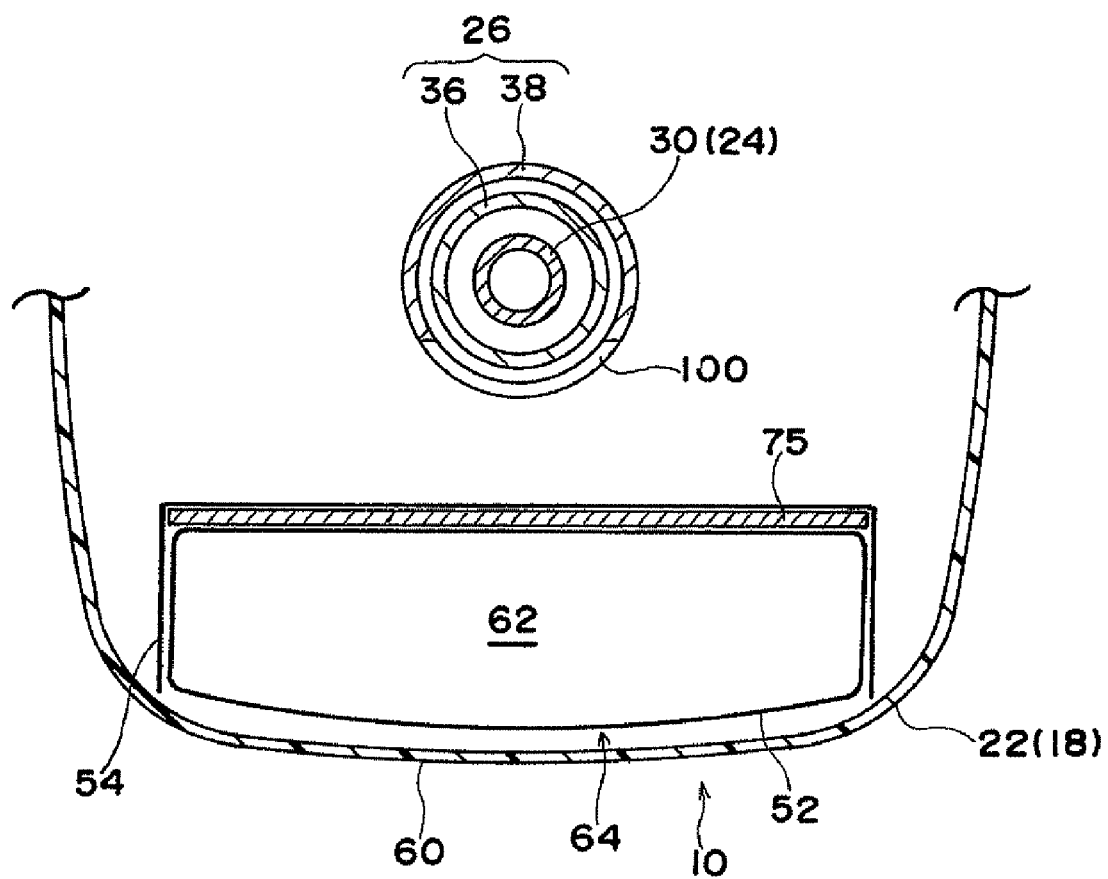
FIG. 8 is an enlarged cross-section showing an enlarged view of a cross-section on line 8-8 of FIG. 6.

The outer tube 38, supported at the instrument panel reinforcement 40 side by the housing 48, functions as a fixed-side tube during collapse of the column tube 26, as shown in FIG. 6. A lower portion at the rear of the outer tube 38 and the rear attachment bracket 76 are disposed so as to face each other, however, as shown in FIG. 6, FIG. 8, and FIG. 9, the escape portion 100 is provided by cutting out a portion of the bottom rear of the outer tube 38 that overlaps with the rear attachment bracket 76.

Figure 9:
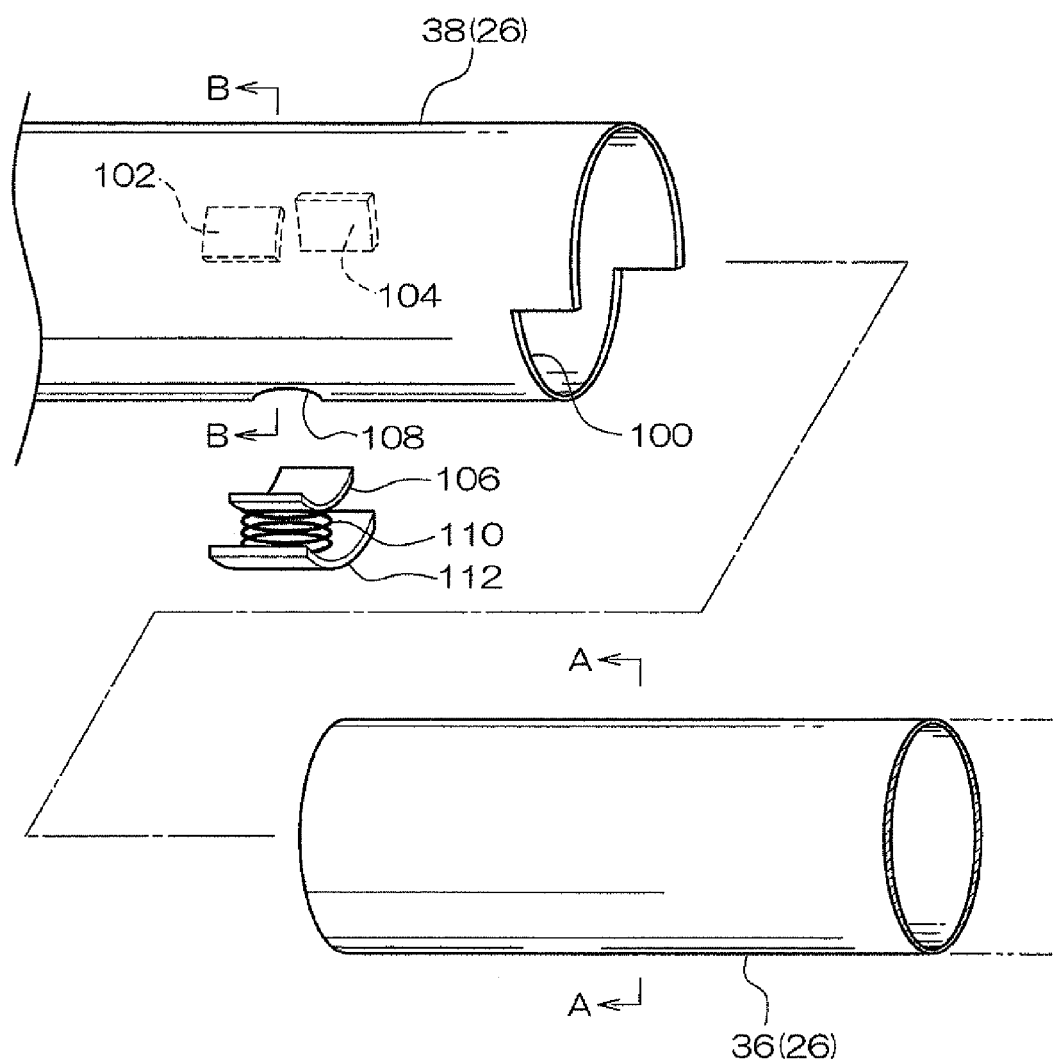
FIG. 9 is an exploded perspective view of a column tube showing support structure for supporting an inner tube with an outer tube, and an escape portion.
Figure 10A:
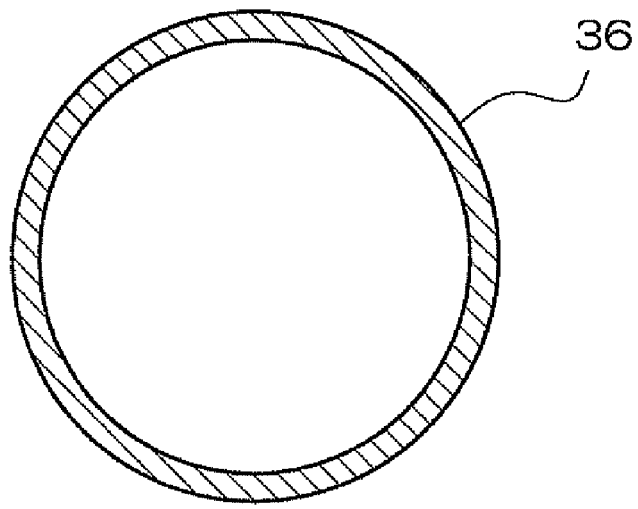
FIG. 10A is a cross-section (cross-section on A-A of FIG. 9) of an inner tube in a direction orthogonal to the inner tube axis.
Figure 10B:
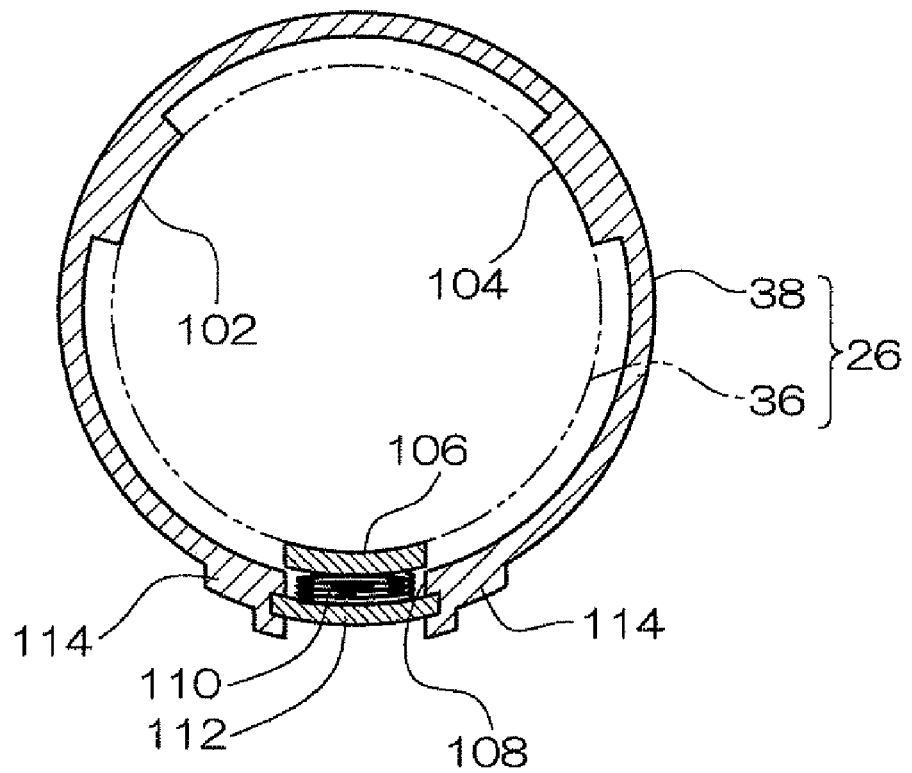
FIG. 10B is a cross-section orthogonal to the axis of (cross-section on B-B of FIG. 9) an outer tube.

It should be noted that, as shown in FIG. 9, FIG. 10A and FIG. 10B, by supporting the inner tube 36 by the outer tube 38 at three points around the circumferential direction (at 120° intervals) the inner tube 36 is supported overall in a non-contact state. Namely, gripping is between two upper projections 102, 104 integrally formed at an angle of 120° on the internal peripheral surface of the outer tube 38, with a spacer 106 disposed as a separate body below these. To correspond therewith, an opening 108 is formed to the outer tube 38, at a position corresponding to the spacer 106 when the inner tube 36 and the outer tube 38 are in an assembled state, and after the spacer 106 is fitted out with a compression coil spring 110 mounted from the outside of the outer tube 38 in the radial direction with a patch 112, fixing is executed by crimping a portion at the leading end of a fixing portion 114. In the fixed state of the patch 112, as shown in FIG. 10B, a bottom portion of the outer peripheral face of the inner tube 36 receives biasing force of the compression coil spring 110, pressing the outer peripheral portion of the inner tube 36 toward the opposite side in the radial direction and into in a state of contact with the two upper projections 102, 104, so as to provide support with the inner tube 36 and the outer tube 38 in a centered state. In the present exemplary embodiment, when placing the projections 102, 104 and spacer 106, these are disposed in positions such that during column collapsing the rear attachment bracket 76 and the projections 102, 104 and spacer 106 avoid interfering with each other.

Operation and Effect

As stated in the introduction to the third exemplary embodiment, by configuration in the above described manner, depending on the vehicle model the installation space 74 of the column-mounted knee airbag device 10 in the steering column 12 axial direction can conceivably be further narrowed.

When trying to secure the designed column collapse stroke in such cases, not only does the lower portion 48A of the housing 48 interfere with the front corner portion 64A of the airbag module 64, but it is also possible that the lower rear end portion of the outer tube (fixed-side tube) 38 interferes with the rear attachment bracket 76 fixed to a lower portion of the outer peripheral face of the inner tube 36. In such cases too, according to the present exemplary embodiment, as shown by the double dashed broken lines in FIG. 6, the potentially interfering portions of the rear attachment bracket 76 (the upper portions of the central portion 76A and leg portions 76B) move relatively so as to enter into the escape portion 100 set in the rear end lower portion of the outer tube 38, and mutual interference can be avoided. As a result, a sufficient amount of collapsing stroke of the column tube 26 can be secured, even when such a narrow installation space 74 as described above is set in the column-mounted knee airbag device 10.

It should be noted that in cases where the fixing position of the airbag module 64 (inflator 50) relative to the inner tube 36 is set at the column front side as shown in FIG. 6, and the shape of the rear attachment bracket 76 is different from that shown, employing a shape that interferes with the lower portion 48A of the housing 48, escape portion(s) may be provided in the rear end of the lower portion 48A of the housing 48 as a bevel or a step etc., such as the double-dashed broken line Q of FIG. 6.

The present exemplary embodiment is a configuration employing the spacer 106 pressed toward the axial center by the compression coil spring 110 fixed to the patch 112 in order to support the inner tube 36 in a non-contact state on the outer tube 38, however there is no limitation thereto, and other configurations may be employed.

Figure 11A:
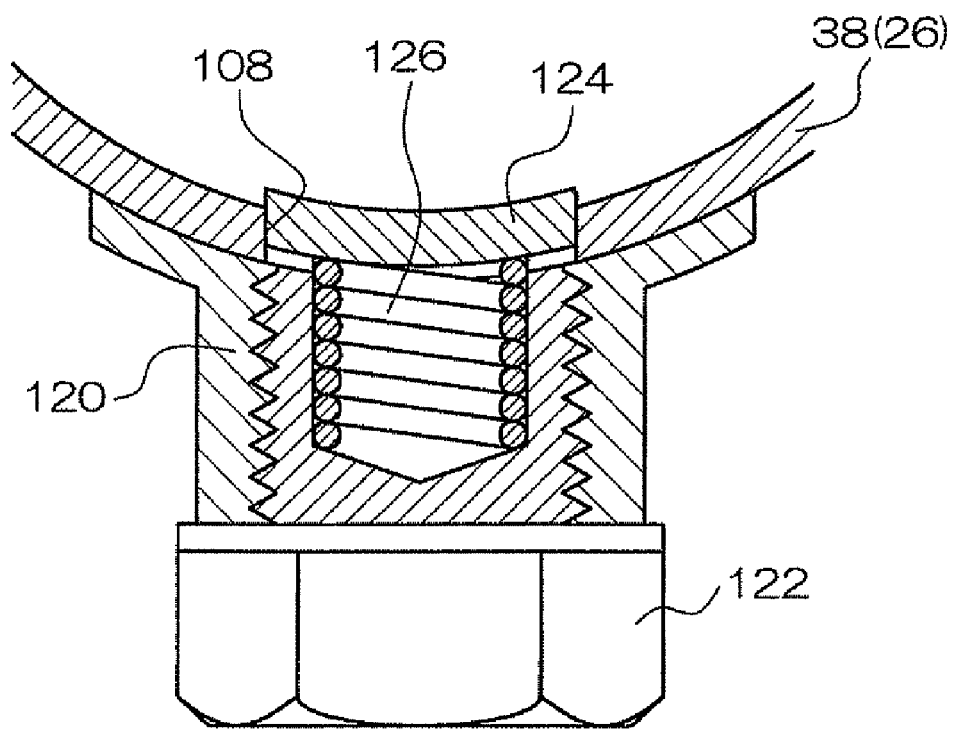
FIG. 11A is a main portion enlarged cross-section showing a first modified example of the support structure shown in FIG. 10B.

For example, in the configuration shown in FIG. 11A, a flange mounted nut 120, whose inner peripheral face is formed with a thread around the periphery of an opening 108 formed in the outer tube 38, is fixed to the outer tube 38 by welding, and a hole-bolt 122 is threaded in from the outside in the axial direction of the opening 108. A spacer 124 and a compression coil spring 126 are fitted to the axial core of the holed-bolt 122.

Figure 11B:
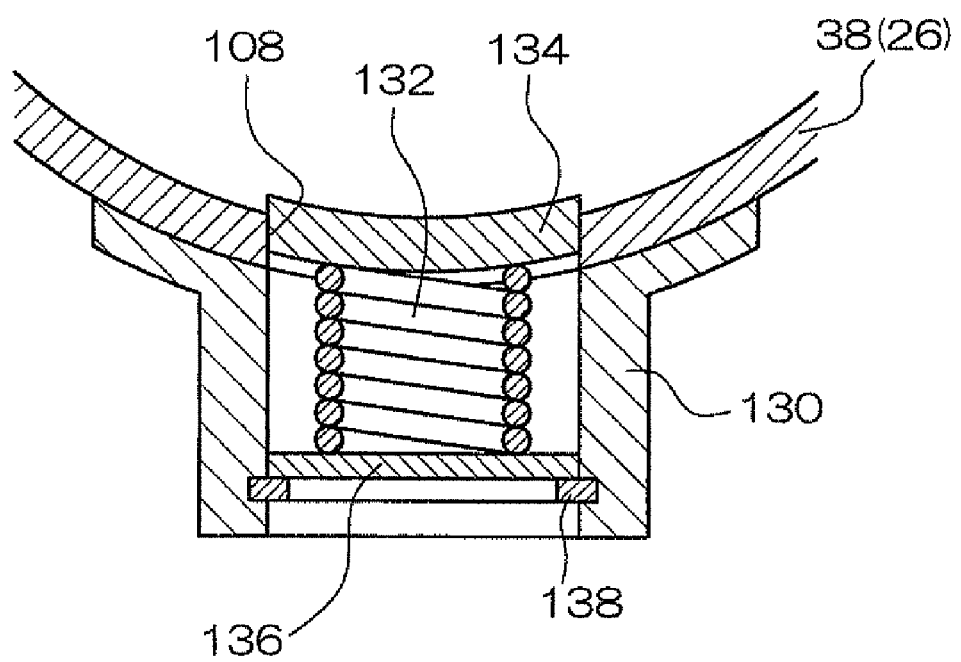
FIG. 11B is a main portion enlarged cross-section showing a second modified example of the support structure shown in FIG. 10B.

For example, in the configuration shown in FIG. 11B, the base end of a circular cylindrical shaped boss 130 is fixed by welding around the periphery of the opening 108 of the outer tube 38, and a compression coil spring 132 is fitted therein. A spacer 134 is fitted to an end portion at the inside in the axial direction of the compression coil spring 132, and after mounting into the circular cylindrical shaped boss 130 in this state, a retainer 136 is inserted and prevented from coming out by an E-ring 138.

The inner tube 36 is also supportable with respect to the outer tube 38 with a three-point support structure using one or other of the configurations described above.

Supplementary Explanation to the Above Exemplary Embodiments (1) In each of the above described exemplary embodiments, the column-mounted knee airbag device 10 is configured to be actuated by a frontal collision, however there is no limitation thereto, and a pre-crash sensor may be installed to a portion at the center of the front bumper etc., and the column-mounted knee airbag device 10 also actuated when a frontal collision is predicted (anticipated).

(2) In each of the above described exemplary embodiments, explanation has been given for a steering column provided with an electrically operated tilting and telescoping mechanism 28, however there is no limitation thereto, and the invention may be applied to a steering column provided with a manual tilting and telescoping mechanism employing an operating lever.

(3) In each of the above described exemplary embodiments, explanation has been given with the lower portion 70A of the body portion 70 of the combination switch 68 as an example of the first obstruction, and with the lower portion 48A of the housing 48 as an example of the second obstruction, however there is no limitation thereto, and combinations including other obstructions disposed so as to project out below the column tubes are appropriate. For example, examples of rigid objects include the same lower portion 70A of the body portion 70 of the combination switch 68 as the first obstruction, and a rigid body of a tilting-motor and/or telescopic-motor as the second obstruction, with the invention applied to the combination of these components.

EXPLANATION OF THE REFERENCE NUMERALS

10 COLUMN-MOUNTED KNEE AIRBAG DEVICE
12 STEERING COLUMN
18 COLUMN COVER
24 STEERING MAIN SHAFT
26 COLUMN TUBE
28 TILTING AND TELESCOPING MECHANISM
36 INNER TUBE
38 OUTER TUBE (FIXED-SIDE TUBE)
40 Instrument Panel Reinforcement
48 HOUSING
48A LOWER PORTION (SECOND OBSTRUCTION)
50 INFLATOR (GAS GENERATING MEANS)
52 KNEE AIRBAG
54 MODULE CASE
64 AIRBAG MODULE
68 COMBINATION SWITCH
70A LOWER PORTION (FIRST OBSTRUCTION)
74 INSTALLATION SPACE
76 REAR ATTACHMENT BRACKET (REAR END ATTACHMENT MEMBER)

76A CENTRAL PORTION
76B LEG PORTIONS
84 FRONT ATTACHMENT BRACKET (FRONT END ATTACHMENT MEMBER)
96 PRESS-FIT MEMBER (FRONT END ATTACHMENT MEMBER)
100 ESCAPE PORTION

The invention claimed is:

1. A column-mounted knee airbag device disposed to the inside of a column cover covering a rear end side of a steering column, the steering column configured with a steering shaft and a column tube covering the steering shaft, wherein the column tube is configured with a double-tube construction, having a sliding-side column tube being at least partially slidably disposed within a fixed-side column tube, the column tube being collapsible within a specific stroke range by input of a load of a specific value or greater, and the steering column comprising:
   a first obstruction, fixed to a rear end side of the sliding-side column tube and disposed in a state such that a portion of the first obstruction projects down below the sliding-side column tube; and
   a second obstruction, fixed to a rear end side of the fixed-side column tube at a position separated by a specific distance from the first obstruction, and disposed in a state such that a portion of the second obstruction projects downward below the fixed-side column tube; and also with an airbag module attached to the steering column so as to be disposed at the column tube below the outer peripheral face of the sliding-side column tube between the first obstruction and the second obstruction, the airbag module comprising a gas generating device configured to generate gas when there is a collision, and a knee-airbag, which is housed inside of the column cover in a folded state and which receives the generated gas and inflates and deploys toward a driver-knee side, wherein the gas generating device is disposed within the airbag module toward a first obstruction side, and the knee-airbag in the folded state is disposed within the airbag module at a second obstruction side and adjacent to the gas generating device.

2. The column-mounted knee airbag device of claim 1, wherein the first obstruction is a combination switch, and the second obstruction is a housing for supporting the column tube on an instrument panel reinforcement extending along a vehicle width direction.

3. The column-mounted knee airbag device of claim 2, wherein a module case of the airbag module is configured from a material that is flexible and/or soft.

4. The column-mounted knee airbag device of claim 2, wherein the airbag module is fixed to the sliding-side column tube at a position in a vicinity of the first obstruction using an attachment member.

5. The column-mounted knee airbag device of claim 4, wherein, in addition to the second obstruction being fixed to the rear end side of the fixed-side column tube, an escape portion is provided on the second obstruction, or provided at a position facing the attachment member at the rear end side of the fixed-side column tube, in order to avoid interference with the attachment member when the column tube collapses.

6. The column-mounted knee airbag device of claim 3, wherein a rear end side of the module case of the airbag module is fixed to the sliding-side column tube at a position in a vicinity of the first obstruction using a rear end attachment member, and a front end side of the module case is fixed to the second obstruction using a front end attachment member.

7. The column-mounted knee airbag device of claim 6, wherein the rear end attachment member and the front end attachment member are disposed so as not to overlap in the vehicle width direction when viewed along an axial direction of the steering column.

8. The column-mounted knee airbag device of claim 3, wherein a rear end side of the module case of the airbag module is fixed to the sliding-side column tube at a position in a vicinity of the first obstruction using a rear end attachment member, and a front end side of the module case is supported so as to be able to slide relative to the sliding-side column tube by use of a front end attachment member.

9. The column-mounted knee airbag device of claim 6, wherein the rear end attachment member is formed in substantially an M-shape when viewed along the column axial direction, and is provided with a central portion fixed to the sliding-side column tube at the position in the vicinity of the first obstruction, and a pair of leg portions, the leg portions being disposed at an outside face at the rear end side of the module case with the gas generating device fixed to the leg portions.

10. The column-mounted knee airbag device of claim 1, wherein the steering column is provided with an electrically operated tilting and telescoping mechanism.

11. The column-mounted knee airbag device of claim 10, wherein the second obstruction is either a tilting-motor or a telescoping-motor.

12. The column-mounted knee airbag device of claim 1, wherein the steering column is provided with an electrically operated tilting and telescoping mechanism.

13. The column-mounted knee airbag device of claim 12, wherein the second obstruction is either a tilting-motor or a telescoping-motor.

14. A column-mounted knee airbag device disposed to the inside of a column cover covering a rear end side of a steering column, the steering column configured with a steering shaft and a column tube covering the steering shaft, wherein the column tube is configured with a double-tube construction, having a sliding-side column tube being at least partially slidably disposed within a fixed-side column tube, the column tube being collapsible within a specific stroke range by input of a load of a specific value or greater, and the steering column comprising:
   a first obstruction, fixed to a rear end side of the sliding-side column tube and disposed in a state such that a portion of the first obstruction projects down below the sliding-side column tube; and
   a second obstruction, fixed to a rear end side of the fixed-side column tube at a position separated by a specific distance from the first obstruction, and disposed in a state such that a portion of the second obstruction projects downward below the fixed-side column tube; and also with an airbag module attached to the steering column so as to be disposed at the column tube below the outer peripheral face of the sliding-side column tube between the first obstruction and the second obstruction, the airbag module comprising a gas generating device configured to generate gas when there is a collision, and a knee-airbag, which is housed inside of the column cover in a folded state and which receives the generated gas and inflates and deploys toward a driver-knee side, wherein the first obstruction is a combination switch, and the second obstruction is a housing for supporting the column tube on an instrument panel reinforcement extending along a vehicle width direction.

15. The column-mounted knee airbag device of claim 14, wherein a module case of the airbag module is configured from a material that is flexible and/or soft.

16. The column-mounted knee airbag device of claim 14, wherein the airbag module is fixed to the sliding-side column tube at a position in a vicinity of the first obstruction using an attachment member.

17. The column-mounted knee airbag device of claim 16, wherein, in addition to the second obstruction being fixed to the rear end side of the fixed-side column tube, an escape portion is provided on the second obstruction, or provided at a position facing the attachment member at the rear end side of the fixed-side column tube, in order to avoid interference with the attachment member when the column tube collapses.

18. The column-mounted knee airbag device of claim 15, wherein a rear end side of the module case of the airbag module is fixed to the sliding-side column tube at a position in a vicinity of the first obstruction using a rear end attachment member, and a front end side of the module case is fixed to the second obstruction using a front end attachment member.

19. The column-mounted knee airbag device of claim 18, wherein the rear end attachment member and the front end attachment member are disposed so as not to overlap in the vehicle width direction when viewed along an axial direction of the steering column.

20. The column-mounted knee airbag device of claim 15, wherein a rear end side of the module case of the airbag module is fixed to the sliding-side column tube at a position in a vicinity of the first obstruction using a rear end attachment member, and a front end side of the module case is supported so as to be able to slide relative to the sliding-side column tube by use of a front end attachment member.

21. The column-mounted knee airbag device of claim 18, wherein the rear end attachment member is formed in substantially an M-shape when viewed along the column axial direction, and is provided with a central portion fixed to the sliding-side column tube at the position in the vicinity of the first obstruction, and a pair of leg portions, the leg portions being disposed at an outside face at the rear end side of the module case with the gas generating device fixed to the leg portions.

22. The column-mounted knee airbag device of claim 14, wherein the steering column is provided with an electrically operated tilting and telescoping mechanism.

23. The column-mounted knee airbag device of claim 22, wherein the second obstruction is either a tilting-motor or a telescoping-motor.

* * * * *